United States Patent [15] 3,700,958

Haferl [45] Oct. 24, 1972

[54] DEFLECTION AND PINCUSHION CORRECTION CIRCUIT

[72] Inventor: Peter Eduard Haferl, Adliswil, Switzerland

[73] Assignee: RCA Corporation

[22] Filed: March 5, 1971

[21] Appl. No.: 121,370

[52] U.S. Cl.............315/24, 315/27 TD, 315/27 GD, 315/27 XY, 315/29

[51] Int. Cl...............................................H01j 29/70

[58] Field of Search..315/27 TD, 27 GD, 27 XY, 24, 315/29

[56] References Cited

UNITED STATES PATENTS

| | | | |
|---|---|---|---|
| 2,995,679 | 8/1961 | Skoyles | 315/29 |
| 2,862,143 | 11/1958 | Wilson et al. | 315/29 X |
| 3,426,243 | 2/1969 | Smeulers et al | 315/29 X |

*Primary Examiner*—Carl D. Quarforth
*Assistant Examiner*—P. A. Nelson
*Attorney*—Eugene M. Whitacre

[57] ABSTRACT

Combined vertical deflection and top and bottom pincushion correction signals are applied to a single amplifier circuit which provides the required vertical deflection n output current as well as pincushion correction signals for a television receiver. Since the frequency of the vertical deflection and pincushion correction signals are substantially different, a series resonant circuit tuned to the horizontal deflection frequency is employed at the output of the amplifier to apply the pincushion signal to the vertical deflection yoke. The resonant circuit includes an inductor which is the primary winding of a transformer whose secondary winding is coupled in series with the vertical deflection yoke to inject the pincushion correction information into the vertical deflection yoke. Negative feedback is employed in the amplifier to preserve the parabolic waveform of the applied pincushion correction signal.

10 Claims, 1 Drawing Figure

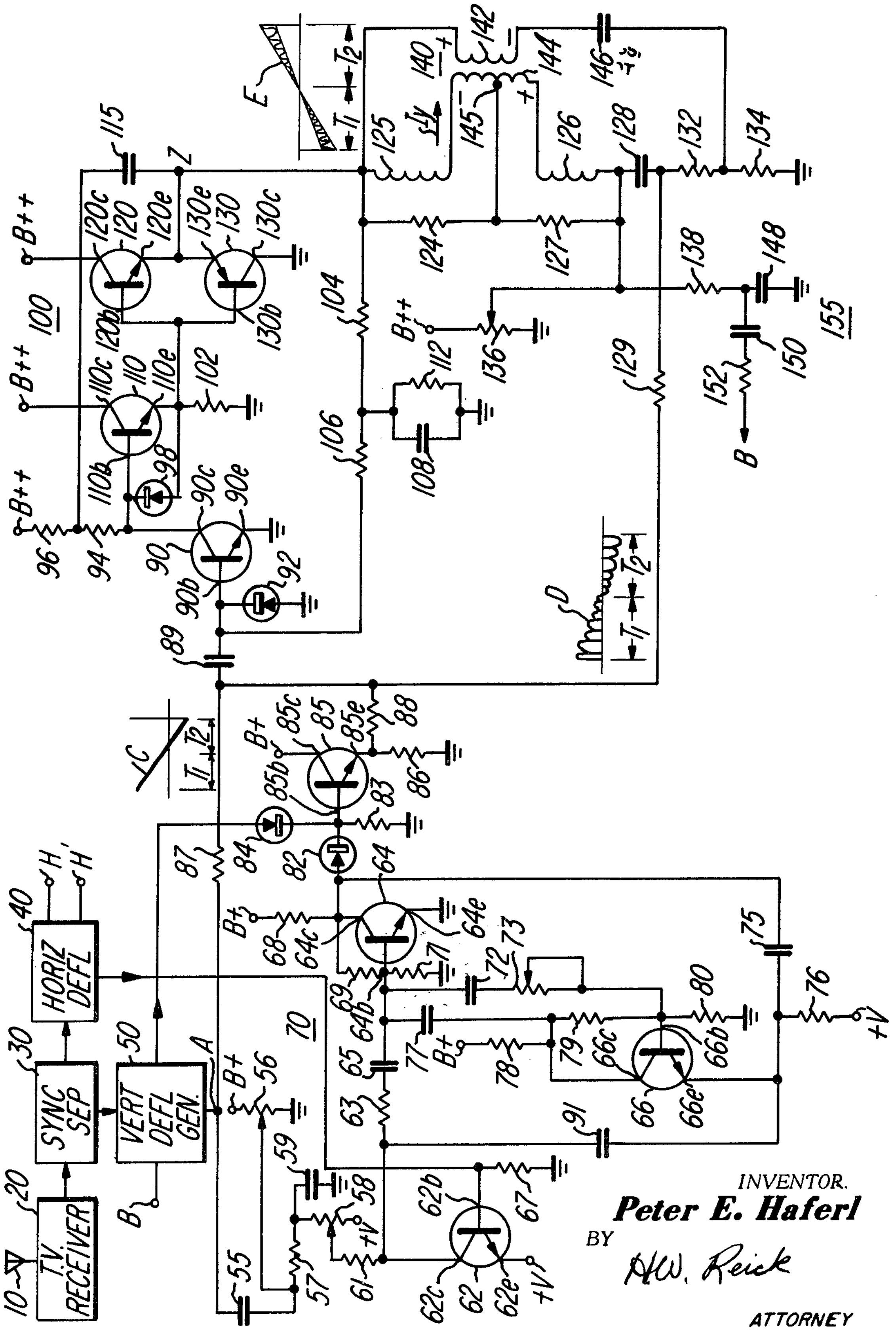
INVENTOR.
Peter E. Haferl
BY
H.W. Reick
ATTORNEY

DEFLECTION AND PINCUSHION CORRECTION CIRCUIT

The present invention relates to deflection circuits including pincushion correction means and particularly to a vertical deflection circuit incorporating top and bottom pincushion correction.

In television receivers employing wide angle deflection systems, top and bottom pincushion correction is provided by injecting a parabolic shaped horizontal frequency correction current, which is amplitude and polarity modulated at the vertical deflection frequency, into the vertical deflection yoke. The correction current combines the horizontal frequency parabolas whose amplitude are modulated by the vertical deflection signal to provide the proper phase and amplitude of pincushion correction over the television raster.

In prior systems, separate amplifiers have been employed to provide the required pincushion correction current which can then be applied to the deflection yoke by means of a transformer coupling arrangement. The pincushion correction signals have been generated using separate parabolic signal generators or by employing a saturable reactor type transformer such as that described in U.S. Pat. No. 3,346,765 assigned to the present assignee.

Circuits embodying the present invention, however, apply the combined vertical deflection sawtooth signals and top and bottom pincushion correction signals to a vertical deflection output amplifier which performs the dual function of providing the required vertical deflection current as well as amplifying the pincushion correction information. The pincushion correction information is then injected into the vertical deflection yoke by means of a transformer whose primary winding forms the inductance of a series resonant circuit tuned to the horizontal deflection frequency and which is coupled to the output of the vertical deflection amplifier. A negative feedback path in the amplifier circuit insures the parabolic pincushion correction signal waveshape is preserved.

The invention can best be understood by referring to the sole FIGURE and accompanying description thereof as well as the appended claims.

The sole FIGURE is a schematic diagram partially in block diagram form of a television receiver employing circuits embodying the present invention.

In the FIGURE, an antenna 10 receives composite television signals and couples them to a television receiver 20 which includes a tuner, a mixer oscillator stage, I.F. amplifier stages, a video detector, a video output circuit, color processing stages if a color television receiver is involved, audio detection and output circuits, and display means such as a color kinescope. The sync separator and the horizontal and vertical deflection generators as well as the circuitry of the present invention are shown separately in the FIGURE.

The receiver 20 applies composite vertical and horizontal synchronization signals and video signals to a synchronization separator stage 30 which separates the synchronization signal components from the composite signal as well as separating the vertical and horizontal synchronizing signal components. The horizontal synchronizing signals are applied to a horizontal deflection circuit 40 which develops the required horizontal deflection current which is applied to a horizontal deflection yoke (not shown in the FIGURE) by means of terminals H–H'.

The vertical synchronizing signals from sync separator 30 are applied to a vertical deflection generator stage 50 which responds to the signals to develop at an output terminal A, vertical deflection rate sawtooth signals. The signals at terminal A are applied to a parabola generator 70 which includes a first transistor 62, a second transistor 64 and a third transistor 66 each having base, collector and emitter electrodes **62*b*, 62*c* and 62*e*; 64*b*, 64*c* and 64*e*; and 66*b*, 66*c* and 66*e*, respectively. The collector electrode 62*c* of transistor 62 is coupled to a slider arm of an adjustable resistor 58 by means of a collector resistor 61. One end of resistor 58 is coupled to a voltage source illustrated by the symbol +V in the FIGURE, while the opposite end of resistor 58 is coupled to the junction of resistor 57 and a capacitor 59**.

The terminal of capacitor 59 remote from this junction is coupled to ground and the terminal of resistor 57 remote from this junction is coupled to a slider arm of an adjustable resistor 56. One end of resistor 56 is coupled to an operating voltage source illustrated by the symbol B+ in the FIGURE, while the opposite end of resistor 56 is coupled to ground. Terminal A of the vertical deflection generator 50 is coupled to the slider arm of resistor 56 by means of a coupling capacitor 55. The emitter electrode **62*e* of transistor 62** is coupled to the +V supply.

Horizontal retrace pulses which occur during each horizontal flyback interval are applied to the base electrode 62b of transistor 62 from the horizontal deflection stage 40. These signals are of a polarity to render transistor 62 conductive during each horizontal flyback interval. Coupled from base electrode **62*b* of transistor 62 to ground is a resistor 67**.

The collector electrode **62*c* of transistor 62 is also coupled to the base electrode 64*b* of transistor 64 by means of the series combination of a resistor 63 and a capacitor 65. The collector electrode 64*c* of transistor 64 is coupled to the B+ supply by means of a collector resistor 68. A resistor 69 couples the collector electrode 64*c* of transistor 64 to the base electrode 64*b* of transistor 64 and a resistor 71 couples the base electrode 64*b* of transistor 64 to ground. The emitter electrode 64*e* of transistor 64** is coupled directly to ground.

A negative feedback path including the third transistor 66 couples the collector electrode **64*c* of transistor 64 to the base electrode 64*b* of transistor 64. This feedback path includes a first differentiating circuit comprising a capacitor 75 coupled from the collector electrode 64*c* of transistor 64 to the emitter electrode 66*e* of transistor 66 and a resistor 76 coupled from the junction of capacitor 75 and the emitter electrode 66*e* of transistor 66** to the +V supply.

The collector electrode **66*c* of transistor 66 is coupled to the B+ supply by means of a resistor 78. A resistor 79 couples the collector electrode 66*c* of transistor 66 to the base electrode 66*b* of transistor 66 and a resistor 80 couples the base electrode 66*b* of transistor 66 to ground. A second differentiating network includes a capacitor 77 coupled from the collector electrode 66*c* of transistor 66 to the base electrode 64*b* of transistor 64. The input impedance of the base circuit of transistor 64** forms the resistive portion of the second differentiating circuit.

A capacitor 72 is serially coupled to a pincushion phase adjustment resistor 73, the series combination being coupled from the base electrode 66*b* of transistor 66 to the base electrode 64*b* of transistor 64. Coupled from the emitter electrode 66*e* of transistor 66 to the collector electrode 62*c* of transistor 62 is a capacitor 91.

The output signals developed at the collector electrode 64*c* of transistor 64 are applied to an emitter follower transistor 85 by means of a diode 82 having an anode electrode coupled to the collector electrode 64*c* of transistor 64 and a cathode electrode coupled to a base electrode 85*b* of transistor 85. Diode 82 is normally conductive but is reverse biased during each vertical blanking interval by means of a positive voltage pulse developed across a base resistor 83 which is coupled from the cathode of diode 82 to ground. These positive pulses are provided by the vertical deflection generator 50 and are applied to the junction of diode 82 and resistor 83 by means of a diode 84 poled to conduct the positive blanking pulses.

A collector electrode 85*c* of transistor 85 is coupled to the B+ supply and an emitter electrode 85*e* of transistor 85 is coupled to ground by means of an emitter resistor 86. The signals developed across emitter resistor 86 are applied to the vertical deflection output amplifier 100 by means of the resistor 88 and coupling capacitor 89. The signals at the junction of resistor 88 and capacitor 89 are shown to the right and below resistor 88 by the waveform D.

The sawtooth shaped vertical deflection signals produced by the circuit 50 are also coupled from output terminal A of circuit 50 to the vertical deflection output amplifier 100 by means of a resistor 87 coupled from terminal A to the coupling capacitor 89. Amplifier 100 includes an input stage having a transistor 90 with base, collector and emitter electrodes 90*b*, 90*c* and 90*e*, respectively. A diode 92 has a cathode electrode coupled to the base electrode 90b of transistor 90 and an anode electrode coupled to ground. The collector electrode 90*c* of transistor 90 is coupled to a source of operating potential indicated by the symbol B++ in the FIGURE by means of series collector resistor 94 and 96.

Collector electrode 90*c* of transistor 90 is also coupled to a base electrode 110*b* of a driver transistor 110. The collector electrode 110*c* of transistor 110 is coupled directly to the B++ supply. The emitter electrode 110*e* of transistor 110 is coupled to ground by means of an emitter resistor 102. A diode 98 has a cathode electrode coupled to the base electrode 110b of transistor 110 and an anode electrode coupled to the emitter electrode 110*e* of transistor 110. The emitter electrode 110*e* of transistor 110 is coupled to base electrodes 120*b* and 130*b* of the complementary-symmetry coupled output transistors 120 and 130, respectively.

A collector electrode 120*e* of transistor 120 is coupled directly to the B++ supply while a collector electrode 130c of transistor 130 is coupled directly to ground. An emitter electrode 120*e* of transistor 120 is coupled to the emitter electrode 130*e* of transistor 130, their junction forming a terminal indicated by the symbol Z. A positive feedback capacitor 115 is coupled from the terminal Z to the junction of resistors 94 and 96. A direct current negative feedback path is coupled from terminal Z to the base electrode 90*b* of transistor

90 and includes series resistors 104 and 106 and the parallel combination of a capacitor 108 and a resistor 112 coupled from the junction of resistors 104 and 106 to ground.

The vertical deflection yoke comprising portions 125 and 126 is coupled to terminal Z. A pincushion transformer 140 has a primary winding 142 having one terminal coupled to terminal Z and the opposite terminal coupled to a capacitor 146. The terminal of capacitor 146 remote from the junction to winding 142 is coupled to ground by means of a resistor 134.

A secondary winding 144 of pincushion transformer 140 is coupled in series relation between vertical deflection windings 125 and 126 and includes a center tap terminal 145. A DC blocking capacitor 128 is coupled to the yoke winding 126, and the junction of capacitor 128 remote from this connection is coupled to ground by means of series resistors 132 and 134.

An alternating current feedback path from the junction of capacitor 128 and resistor 132 to the junction of resistor 87 and coupling capacitor 89 includes a resistor 129. Damping resistors 124 and 127 are coupled in series relation to each other and the combination is coupled across the vertical deflection yoke 125, 126. The junction of resistors 124 and 127 is coupled to the center tap 145 of the secondary winding 144 of pincushion transformer 140.

A direct centering voltage is applied to the junction of capacitor 128 with the vertical deflection yoke segment 126 by means of the connection to the slider arm of an adjustable resistor 136 coupled from the B++ supply to ground.

The junction of capacitor 128 and vertical yoke segment 126 is further coupled to a waveshaping network 155 which supplies an S-shaping signal to the vertical deflection generator 50 at terminal B. Waveshaping network 155 includes a resistor 138, a capacitor 148, a capacitor 150 and a resistor 152 coupled as shown in the FIGURE.

The detailed operation of the parabola generator 70 is described in my copending United States patent application entitled "Pincushion Correction Waveform Generator" concurrently filed herewith and assigned to the present assignee. A brief description, however, follows.

The sawtooth shaped vertical deflection rate signals shown in waveform C appear at terminal A of the vertical deflection generator 50 and are chopped into horizontal frequency pulses having a pulse width equivalent to a horizontal scan interval by the switching action of transistor 62 in response to horizontal deflection retrace pulses applied to its base electrode 62*b* from the horizontal deflection stage 40. The resulting horizontal frequency pulses are amplitude and polarity modulated by the sawtooth waveform and are applied to the base electrode 64*b* of transistor 64 which amplifies these pulses and converts them by means of the doube differentiating feedback path including transistor 66 into parabolic shaped signals as shown in waveform D which appears at the output of the emitter follower transistor 85.

Thus, both the sawtooth shaped waveform C and the parabolic horizontal frequency signals shown in waveform D are applied to the vertical deflection output stage 100. The amplifier 100 is a conventional complementary-symmetry type output stage driven by an emitter follower driver transistor 110 and an input transistor 90. The output stage operates in a conventional manner to amplify the sawtooth shaped signals which are applied to the vertical deflection yoke 125, 126 by means of the relatively low output impedance terminal V.

During the first half of each vertical scan interval ($T_1$ in the waveform diagrams), transistor 130 will be conductive to provide a current path for the vertical deflection current; and during the second half of each vertical deflection interval ($T_2$ in the waveform diagrams), transistor 120 will provide a conduction path for the vertical deflection yoke. During the $T_2$ interval, the vertical deflection current flows in the direction indicated by the arrow accompanied by the symbol $I_v$ adjacent to vertical yoke segment 125.

The parabolic pincushion correction information is likewise amplified by the vertical output stage 100 and is combined with the vertical sawtooth waveform to provide a vertical yoke current illustrated by the waveform E shown adjacent the output amplifier. It is seen that the waveform E comprises a substantially sawtooth portion as well as horizontal frequency components which represent the top and bottom pincushion correction signal. Since the output terminal Z is a relatively low impedance and the vertical deflection yoke appears as a relatively high impedance to the horizontal frequency pincushion correction information, it is necessary to provide impedance matching for both the relatively low frequency vertical deflection signal and the relatively high pincushion correction signal to provide the necessary pincushion correction signal amplitude.

This is accomplished by means of transformer 140 which has a primary winding 142 that forms with capacitor 146 a series resonant circuit which is tuned to the horizontal deflection frequency and which appears as a relatively high parallel impedance to the vertical deflection current. Thus, the vertical deflection signal components flow substantially only through the vertical yoke windings 125 and 126 while the horizontal frequency pincushion correction information current flows through the primary winding 142 of transformer 140.

The voltage induced in the secondary winding 144 of transformer 140 due to the pincushion correction information current in the primary winding 142 is of the polarity as shown in the diagram during the $T_2$ portion of each vertical deflection interval. The induced voltage produces a pincushion correction current of horizontal deflection frequency that flows in the vertical deflection yoke and combines with the vertical deflection current to provide the required top and bottom pincushion correction.

A sample of the horizontal frequency pincushion correction current in the primary winding 142 of transformer 140 is taken across the resistor 134 and combined with a sample of the vertical deflection yoke current across resistors 132 and 134 and coupled to the input of the amplifier 100 by means of the negative feedback path including resistor 129. This negative feedback of the pincushion correction signal insures that the pincushion correction waveform remains substantially parabolic in shape which would otherwise have a tendency to become sinusoidal due to the series resonant circuit comprising primary winding 142 and capacitor 146.

In one embodiment, the following parameters were employed:

| | |
|---|---|
| Winding **142** of transformer **140** | 45 turns |
| Transformer winding **145** | 76 turns bifilar wound |
| Capacitor **146** | 22 microfarads |
| Waveform C | 6 volts peak-to-peak |
| Waveform D | 3 volts peak-to-peak |
| Waveform E | 1.2 amperes including a .1 ampere peak-to-peak pincushion correction component |
| B+ Supply | 25 volts |
| B++ Supply | 55 volts |
| +V Supply | 5 volts |

What is claimed is:

1. A pincushion correction circuit for use with a cathode ray tube display device comprising:
   - a source of field deflection frequency signals,
   - a source of line deflection frequency signals whose amplitude and polarity is modulated in accordance with said field deflection frequency signals,
   - an amplifier having input and output terminals,
   - means for applying said field deflection frequency signals and said line deflection frequency signals to said input terminal of said amplifier,
   - a field deflection yoke coupled to said output terminal of said amplifier, and
   - a transformer having primary and secondary windings, said primary winding being coupled in series with a capacitor to form a series resonant circuit tuned to the line deflection frequency, said series resonant circuit being connected in parallel with said yoke, and wherein said secondary winding of said transformer is coupled to said field deflection yoke in a manner such that said line deflection frequency signals are combined with said field deflection frequency signals to provide field deflection and top and bottom pincushion correction for said display device.

2. A circuit as defined in claim 1 wherein each of said line deflection frequency signals has a parabolic waveshape with an amplitude which is a maximum at the beginning and end of each field deflection interval, which diminishes toward the center of each field deflection interval and has a polarity which follows the polarity of said field deflection frequency signals.

3. A circuit as defined in claim 1 wherein said field deflection yoke comprises first and second winding portions and wherein said secondary winding of said transformer is serially coupled said field deflection yoke between said first and said second winding portions.

4. A circuit as defined in claim 1 wherein said amplifier circuit further comprises:
   - negative feedback circuit means coupled to said field deflection yoke and said series resonant circuit and connected to said input terminal of said amplifier for feeding back to said input terminal a signal representative of said field deflection current and said line frequency current in said field deflection yoke and said line frequency current in said series resonant circuit, in a sense to preserve the waveshape of said line deflection signals which are applied to said input terminal from said source of line deflection signals.

5. A circuit as defined in claim 4 wherein a capacitor is coupled in circuit between said field deflection yoke and said negative feedback circuit means.

6. A top and bottom pincushion correction circuit for providing pincushion correction for a relatively wide angle deflection system for an image display device whereby top and bottom pincushion correction signals are simultaneously applied vertical deflection signals to a single vertical deflection output amplifier and wherein the relatively high frequency pincushion correction signals are injected into a vertical deflection yoke, the combination comprising:

a source of vertical deflection sawtooth signals, a source of parabolic horizontal frequency pincushion correction signals whose amplitude and polarity is modulated in accordance with said vertical deflection sawtooth signals, an amplifier having input and output terminals, means for applying said vertical deflection signals and said pincushion correction signals to said input terminal of said amplifier, a vertical deflection yoke comprising first and second winding segments coupled between said output terminal of said amplifier and one terminal of a capacitor, the other terminal of said capacitor being coupled to a reference potential, and impedance matching means comprising a transformer having a primary winding which is coupled in series with a second capacitor to form a series resonant circuit tuned to the horizontal deflection frequency and coupled from said output terminal of said amplifier to said reference potential, said transformer further including a secondary winding serially coupled to said vertical deflection yoke between said first and second segments of said vertical yoke whereby vertical deflection current substantially flows through said vertical deflection yoke including the series coupled transformer secondary winding and whereby pincushion correction current is injected into said vertical deflection yoke by means of said transformer.

7. A top and bottom pincushion correction circuit for providing pincushion correction for a relatively wide angle deflection system for an image display device whereby top and bottom pincushion correction signals are simultaneously applied with vertical deflection signals to a single vertical deflection output amplifier and wherein the relatively high frequency pincushion correction signals are injected into a vertical deflection yoke by means of an impedance matching device including a series resonant circuit, the combination comprising:

a source of vertical deflection sawtooth signals, a source of parabolic horizontal frequency pincushion correction signals whose amplitude and polarity is modulated in accordance with said vertical deflection sawtooth signals, an amplifier having input and output terminals, said output terminal having a relatively low output impedance, means for applying said vertical deflection signals and said pincushion correction signals to said input terminal of said amplifier, a vertical deflection yoke coupled from said output terminal of said amplifier to a reference potential, said vertical deflection yoke providing a relatively high impedance to said pincushion correction information, and means for injecting said pincushion correction information into said vertical deflection yoke such that said pincushion correction signals produce a resulting correction current for providing the necessary pincushion correction.

8. A circuit as defined in claim 7 wherein said means for injecting said pincushion correction information into said vertical deflection yoke comprises a transformer having primary and secondary windings, said primary winding being coupled in series with a capacitor to form a series resonant circuit tuned to the horizontal deflection frequency, said series resonant circuit being coupled between said output terminal of said amplifier and said reference potential, and wherein said secondary winding of said transformer is coupled to said vertical deflection yoke in a manner such that said pincushion correction signals are combined with said vertical deflection frequency signals to provide vertical deflection and top and bottom pincushion correction.

9. A circuit as defined in claim 8 wherein said vertical deflection yoke comprises first and second winding segments and wherein said secondary winding of said transformer is serially coupled to said vertical deflection yoke between said first and said second winding segments.

10. A circuit as defined in claim 7 wherein said amplifier further includes:

sampling means coupled to said vertical deflection yoke and to said series resonant circuit for obtaining a signal representative of said vertical deflection current and said pincushion correction current in said vertical deflection yoke and said pincushion correction current in said series resonant circuit, and negative feedback circuit means coupling said sampling signal to said input terminal of said amplifier in a sense to preserve the parabolic waveshape of said pincushion correction signals which are applied to said input terminal of said amplifier from said source of pincushion correction signals.

* * * * *

UNITED STATES PATENT OFFICE
CERTIFICATE OF CORRECTION

Patent No. 3,700,958 Dated Oct. 24, 1972

Inventor(s) Peter Eduard Haferl

It is certified that error appears in the above-identified patent and that said Letters Patent are hereby corrected as shown below:

On the title sheet, the following should be inserted -- Claims priority, application Great Britain, March 11, 1970, 11688/70 --. Col. 6, line 8, that portion reading "22 microfarads" should read -- .22 microfarads --.

Signed and sealed this 24th day of April 1973.

(SEAL)
Attest:

EDWARD M.FLETCHER,JR.
Attesting Officer

ROBERT GOTTSCHALK
Commissioner of Patents